United States Patent [19]
Slavin et al.

[11] 3,993,939
[45] Nov. 23, 1976

[54] PRESSURE VARIABLE CAPACITOR

[75] Inventors: Michael Slavin, Gloucester Point;
Ralph W. Carp, Newport News;
George T. Bata, Grafton, all of Va.

[73] Assignee: The Bendix Corporation, Southfield, Mich.

[22] Filed: Jan. 7, 1975

[21] Appl. No.: 539,212

[52] U.S. Cl. .............................. 317/246; 73/398 C
[51] Int. Cl.² .......................................... H01G 7/00
[58] Field of Search ........... 317/245, 246, 247, 248, 317/249 R, 398 C; 73/398 C

[56] References Cited
UNITED STATES PATENTS

| | | | |
|---|---|---|---|
| 1,665,616 | 4/1928 | Trump | 317/249 R |
| 1,871,048 | 9/1932 | Dubilier | 317/249 R |
| 2,439,047 | 4/1948 | Grinstead | 73/398 C |
| 2,829,520 | 4/1958 | Stanton | 73/398 C |
| 3,328,653 | 6/1967 | Wolf, Jr. | 317/246 |
| 3,619,742 | 11/1971 | Rud | 317/246 |
| 3,643,041 | 2/1972 | Jackson | 317/246 X |
| 3,693,059 | 9/1972 | Harris | 317/246 X |
| 3,808,480 | 4/1973 | Johnson | 317/246 |

*Primary Examiner*—E. A. Goldberg
*Attorney, Agent, or Firm*—W. G. Christoforo; Bruce L. Lamb

[57] ABSTRACT

A pressure responsive diaphragm is attached to a substrate carrying a thick film metallic coating covered by a dielectric glass coating so that the diaphragm and thick film coating comprise a pressure variable capacitor. Changes in pressure difference across the diaphragm force the diaphragm to roll against the glass to vary the area of diaphragm in contact with the glass, thus changing the capacity.

10 Claims, 9 Drawing Figures

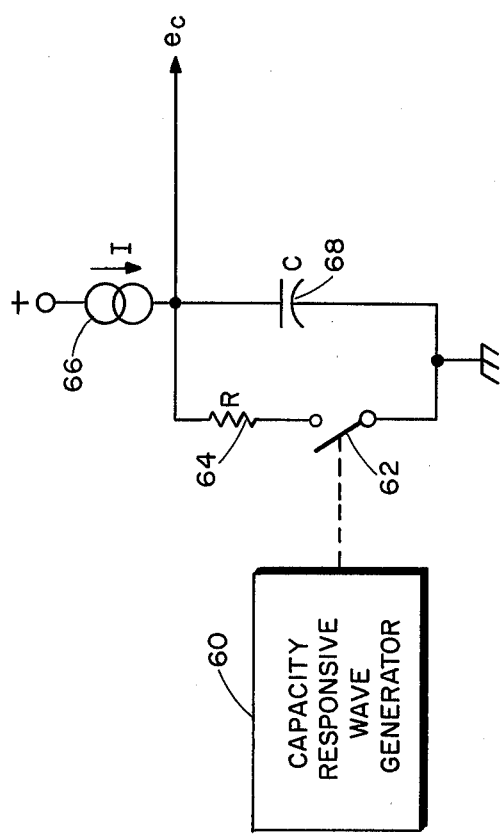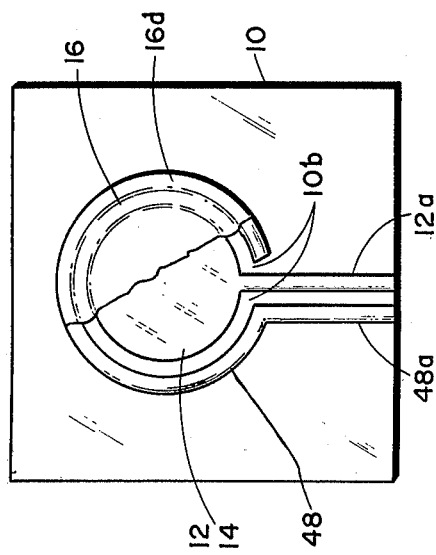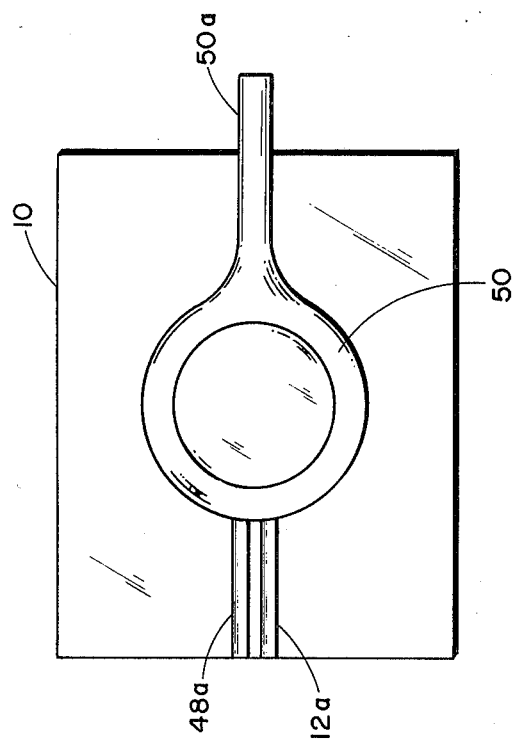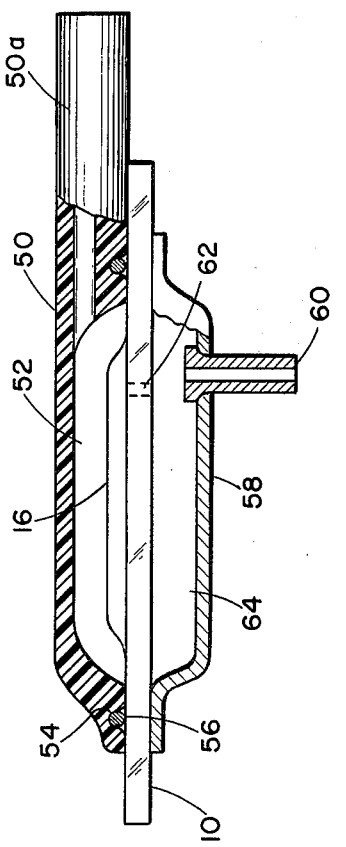

PRESSURE VARIABLE CAPACITOR

BACKGROUND OF THE INVENTION

This invention relates to pressure responsive capacitors having a pressure responsive diaphragm which comprises one capacitor plate and which cooperates with a thick film metallic coating which comprises a second capacitor plate. The invention more particularly relates to pressure responsive capacitors as described above where changes in capacity are due principally to pressure responsive changes in the effective area of the capacitor plate.

Pressure transducing or sensing devices of various types are well known in the art. Of these devices, types of pressure responsive capacitors have been devised wherein a pressure responsive diaphragm is sealed over an electrode fixed on a dielectric substrate so that changes in pressure difference across the diaphragm cause the distance between the diaphragm and fixed electrode to vary, thus varying the capacity between the diaphragm and fixed electrode in accordance with pressure. Such a device is described in U.S. Pat. No. 3,808,480. In the art, these pressure responsive capacitors have been arranged in frequency determining circuits or oscillators to provide a frequency signal correlated to pressure. It has also been suggested that the pressure responsive capacitors be arranged in bridge circuits to provide a voltage correlated to pressure.

Another type of known pressure responsive capacitor is comprised of a resilient dielectric material sandwiched between at least two electrode plates. Pressure across the plate resiliently compresses the dielectric to produce a capacity correlated to pressure. An example of this type device can be seen in U.S. Pat. No. 3,302,080.

In these known types of pressure responsive capacitors, the change in capacity brought about as a result of a change in pressure has been caused by the change in distance between the fixed electrode and the pressure responsive diaphragm which comprises the second electrode of the capacitor. The change in capacity over the pressure difference range has thus been relatively limited, especially where a relatively small pressure responsive capacitor is involved.

SUMMARY OF THE INVENTION

A pressure variable or responsive capacitor having a relatively wide range of capacity with respect to the range of pressure differential to which it is exposed is comprised of a dielectric substrate on which is affixed a flat electrode. A thin dielectric is deposited over the fixed electrode. The periphery of a flexible pressure responsive diaphragm means is then hermetically sealed to the substrate so that the periphery of the diaphragm means surrounds and is electrically insulated from the fixed electrode, while the central portion of the diaphragm overlays the electrode. The volume between the diaphragm and the substrate is preferably evacuated to a predetermined pressure to collapse the diaphragm into contact with the fixed electrode. In any event, the diaphragm is designed to be in contact with the dielectric deposited on the fixed electrode over at least a portion of the pressure differential range which will be impressed across the diaphragm, and preferably the diaphragm will be in contact with the dielectric over the whole range of pressure differential. In particular, the diaphragm is optimally designed to be in relatively small contact with the dielectric at the low end of the pressure differential range and to roll into contact with the dielectric over an increasingly greater area as the pressure differential across the diaphragm increases towards the high end of the pressure differential range. In this manner the change in capacity of the pressure variable capacitor is dependent upon a change in the effective capacitor plate area to thus provide a wider range of capacity change with respect to pressure differential change than is normally available with a pressure responsive capacitor whose capacity varies with distance between plates.

It is thus an object of this invention to provide a sensitive capacitor pressure transducer which includes a fixed electrode deposited on a substrate and covered by a dielectric and including a diaphragm which hermetically seals the fixed electrode and dielectric and is arranged to roll in increasingly greater contact area with the dielectric as the pressure difference across the diaphragm increases.

It is another object of this invention to provide a pressure responsive capacitor whose effective area varies in accordance with the pressure difference thereacross.

A further object of this invention is to provide a capacitive pressure sensor having a relatively wide range of capacity versus pressure differential impressed thereacross.

These and other objects and advantages of the invention will be made apparent from an understanding of the following description of the preferred embodiment.

BRIEF DESCRIPTION OF THE DRAWINGS

FIG. 6 is a plan view of the device of FIG. 1 cut away to show an electrode and tracks affixed to the substrate.

FIG. 7 illustrates means for packaging the invention.

FIG. 8 is a plan view of the device of FIG. 7.

FIG. 9 is a schematic of an electrical circuit useful with the invention for linearizing the output of the device with respect to pressure differential change.

In the various figures, like reference numbers refer to like elements.

DESCRIPTION OF THE PREFERRED EMBODIMENT

Figure 1:
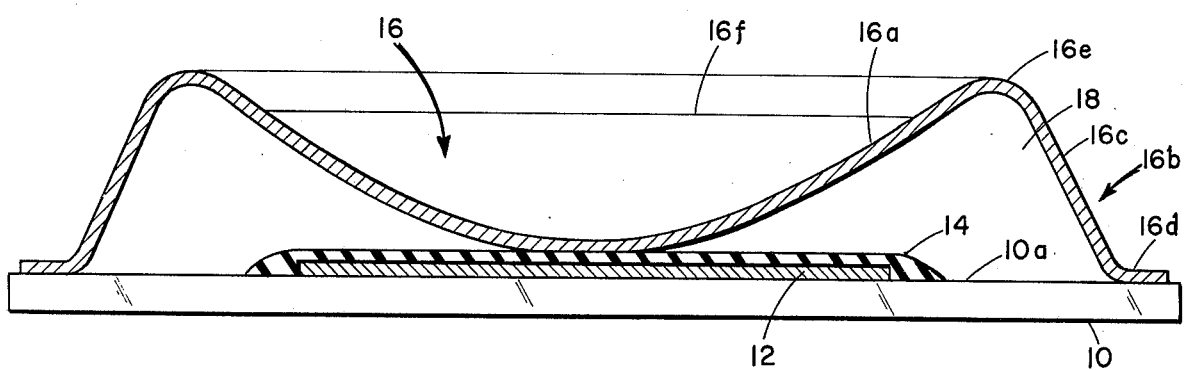
FIG. 1 illustrates the invention in cross section with a relatively low pressure differential impressed across the diaphragm.

Refer to FIG. 1 where a pressure variable capacitor built in accordance with the principles of this invention is seen. The illustrated capacitor is comprised of a thin, flat, plate-like electrically nonconductive substrate 10 having a supporting surface 10a, which is preferably relatively smooth and even. Substrate 10 consists of one of the substrate materials known to those skilled in the art such as a ceramic alumina material. As will become apparent as this description proceeds, it is desirable that substrate 10 be relatively impervious to gasses and water vapor and that it be receptive to conductive paths or lands to be adhered to its surface.

A conductive film 12 which, as will be seen, comprises one plate or electrode of the pressure variable capacitor is printed or deposited on surface 10a so as to adhere thereto. A dielectric film 14 is deposited or coated over electrode 12 and an area around the electrode on surface 10a. The dielectric is suitably a glass material of the type known to those skilled in the thick film art with electrode 12 and dielectric 14 being deposited or printed by thick film techniques. In a device actually built, the dielectric used was designated Thick Film Paste No. 06209-S and was available from Owen-Illinois, Inc., Toledo, Ohio.

A thin, flexible electrically conductive diaphragm 16 includes a flexible central section 16a, the section within circle 16f, and a relatively rigid periphery section 16b comprised of an upstanding angular portion 16c and an outturned angular portion 16d. The section of the diaphragm 16e intermediate of standing section 16c and central section 16a forms the transition between the relatively rigid portion of the diaphragm and the relatively flexible portion of the diaphragm and in particular is formed to permit the central section 16a to roll against dielectric 14 as the pressure differential across the diaphragm increases. The outturned periphery 16d of the diaphragm is hermetically sealed against surface 10a. In a pressure variable capacitor actually built the diaphragm was attached to the substrate with a preformed semi-cured glass supported epoxy adhesive. The adhesive was then fully cured to complete the hermetic seal.

The volume below diaphragm 16, that is volume 18, is evacuated and can be back filled to a predetermined pressure with a standard gas if so desired. Means for evacuating volume 18 are not shown, however suitable means are known to those skilled in the art. For example, diaphragm 16 can include a centrally located hole with the capacitor being assembled in a vacuum chamber which is pumped down to evacuate space 18 through the hole in the diaphragm and the hole then plugged with solder. In the pressure variable capacitor actually built a pump out tube was used which is seen in FIG. 7 and which will be explained in detail below.

Figure 2:
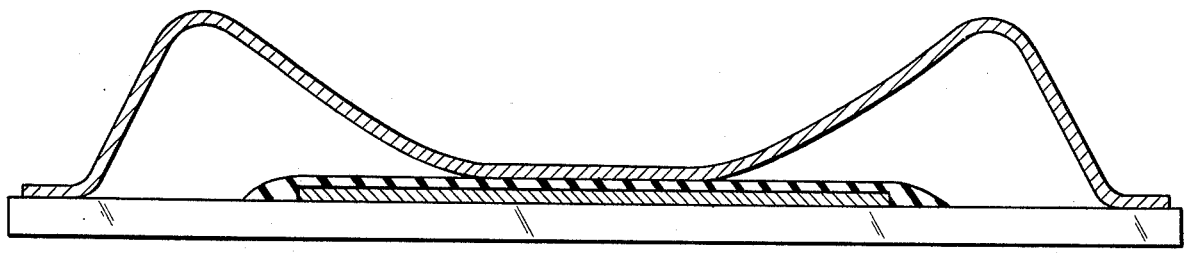
FIG. 2 shows the device of FIG. 1 with a relatively medium pressure differential impressed across the diaphragm.
Figure 3:
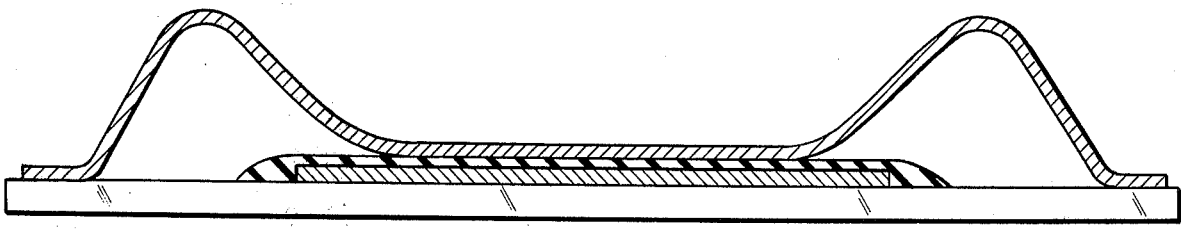
FIG. 3 shows the device of FIG. 1 with a relatively high pressure differential impressed across the diaphragm.
Figure 4:
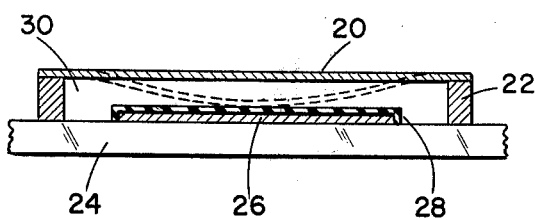
FIG. 4 illustrates another form of the invention.

FIG. 1 shows the condition of the diaphragm of the pressure variable capacitor when the pressure difference thereacross is at the low end of its range. As the pressure difference across the diaphragm increases, the diaphragm will roll into increasingly wider contact with dielectric 14, as illustrated by FIGS. 2 and 3, to thus increase the effective area of the capacitor plates. It should thus be obvious that the designer must take care that his diaphragm be adapted to roll as described as the pressure thereacross changes rather than being displaced bodily with respect to the fixed electrode. FIG. 4, reference to which should now be made, illustrates another type of diaphragm which will roll against a fixed electrode. In the figure diaphragm 20 is shown in full line in its relatively unstressed condition and in dashed line in a stressed condition. Diaphragm 20 is preferably disc shaped and hermetically sealed at its periphery to substrate 24 through annular ring 22. Printed on the substrate are electrode 26 and dielectric 28. As the pressure difference across the diaphragm increases, either by evacuating space 30 or by increasing the pressure on the diaphragm or by a combination of the above, the center of the diaphragm is deflected downward until it touches dielectric 28 as shown. This is the low end of the pressure range over which the capacitor will operate in the mode taught by this invention. As the pressure difference across the diaphragm increases the diaphragm will roll into increasingly greater contact area with the dielectric. Of course, it is possible to form the diaphragm in its unstressed condition in the shape of the dashed figure. For this type of diaphragm the low end of the pressure range over which the capacitor will operate in the mode taught by this invention will be zero pressure difference across the diaphragm.

It should be noted that the device of FIG. 4 will be particularly susceptible to temperature sensitivity. That is, the capacity versus pressure characteristics of the device will change as the temperature changes. Temperature sensitivity is caused by the inability to match the thermal coefficient of the substrate to the thermal coefficient of the diaphragm. The diaphragm is suitably made of Ni-Span-C alloy, a material whose thermal linear coefficient of expansion is tightly controlled to keep its physical properties consistent. However, the thermal coefficients of substrate materials are not tightly controlled, hence it is necessary that the thermal sensitivity be improved by the specific design of the capacitor. In particular, thermal sensitivity will be improved if the capacitor is designed so that the periphery of the diaphragm is relatively free to move in the direction parallel to the plane of the diaphragm. Of course, it is also necessary that the periphery of the diaphragm be relatively fixed with respect to motion perpendicular to the plane of the diaphragm to ensure that the diaphragm will roll in the mode contemplated by the invention rather than being displaced bodily up and down as pressure difference thereacross changes.

The diaphragm of FIG. 1 meets the requirements of the invention. In particular, the intermediate section 16e permits the central section 16a of the diaphragm to expand and contract relatively freely, that is to move in a direction parallel to the plane of the central portion of the diaphragm, by causing flexure of periphery section 16b about the line defining the top of intermediate section 16e and also about the line defining the intersection of upstanding portion 16c and outturned angular portion 16d. However, as should now be obvious, the central section 16a of the diaphragm is stiffest with respect to forces perpendicular to the plane of the central portion of the diaphragm at circle 16f and becomes increasingly less stiff toward the center of the diaphragm. Thus, a pressure applied uniformly in a downward direction of the diaphragm will cause the center of the diaphragm to deflect a greater distance than the remainder of the diaphragm with the result that the diaphragm will roll over a closely placed subsisting surface as the pressure difference across the diaphragm increases.

In a pressure variable capacitor actually built in accordance with FIG. 1 and exposed to a pressure difference across the diaphragm ranging from 150 to 800 torr, a range of capacity of 100 to 250 picofarad was obtained. The diaphragm was formed of 0.003 inch thick Ni-Span-C. With central section 16a flat, in this embodiment that corresponded to a zero pressure difference across the diaphragm, there was a 0.003 inch separation between the diaphragm and the dielectric. The overall diameter was 1.220 inches and the overall height was 0.056 inches. The diameter of central section 16a was 0.838 inches. The radius of intermediate section 16e was 0.035 inches while the fillet radii were 0.012 inches.

Figure 5:
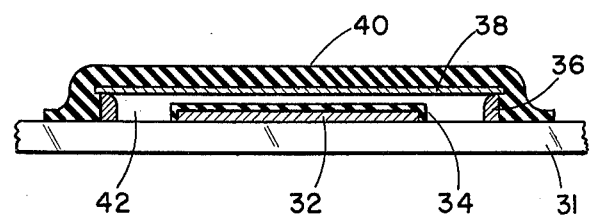
FIG. 5 illustrates a further form of the invention.

Another embodiment of the invention is shown in FIG. 5, reference to which should now be made, where a substrate 31 has affixed to the surface thereof an electrode 32 covered by a thin dielectric 34. An annular ring 36 surrounds electrode 32. A circular diaphragm 38, either flat in the unstressed condition, as shown, or initially formed in the unstressed condition in accordance with the dashed line depiction of FIG. 4, is supported freely at its periphery by ring 36. The diaphragm and ring are then covered by the hat-shaped elastomer structure 40 which is sealed or otherwise mated to substrate 31 to prevent a pressure fluid bearing on structure 40 from leaking into chamber 42, between diaphragm 38 and electrode 32. The inside upper edge of ring 36 can be beveled to facilitate flexure of the diaphragm. In this embodiment the diaphragm is fixed in the vertical direction by ring 36, structure 40 and the pressure thereon. On the other hand, the diaphragm is relatively free to change relative diameter in response to temperature change within elastomer structure 40 since it is not affixed to ring 36.

Refer now to FIG. 6 which shows a plan view of the pressure variable capacitor of FIG. 1 and having a substrate 10 with a typical electrode 12 and its dielectric covering 14 affixed thereto. The diaphragm 16 is shown cut away for clarity. Electrode 12 has a track 12a providing electrical communication therewith under the diaphragm. Track 12a suitably also has a dielectric covering to insulate it where it passes under the outturned angular portion 16d.

A circular track 48 which is affixed to the substrate surrounds electrode 12. Track 48 includes a straight portion 48a. Track 48 is generally of the same planar size as the outturned angular portion 16d of the diaphragm. The diaphragm is sealed to the substrate by a glass-supported epoxy film adhesive prestamped to match the outturned angular portion 16d and placed therebetween and track 48 and cured to complete the bond. The diaphragm may then be soldered to straight track 48a to provide electrical communication thereto. The epoxy film provides additional insulation between the diaphragm and track 12a and also conforms with spaces 10b on either side of track 12a to hermetically seal the diaphragm to the substrate.

Refer now to FIG. 7 which shows means for packaging the invention of FIG. 1 and to FIG. 8 which is a plan view of the device of FIG. 7. Diaphragm 16 is seen affixed to substrate 10. A cap 50 having a port 50a for communication with volume 52 under cap 50, is sealed to substrate 10 by means of O-ring 56 in groove 54. Tubing can now be connected from port 50a to a pressure source to be monitored. Another rigid cap 58 is heremetically sealed to the opposite surface of substrate 10 to form a volume 64 therebetween. A hole 62 in the substrate communicates volume 64 with the space under diaphragm 16. Tube 60 can be used to pump out volume 64 and the space under diaphragm 16 and then sealed. Alternately, tube 60 can be communicated with a second pressure source so that diaphragm 16 rolls in response to the pressure difference of the two sources.

Cap 58 is particularly advantageous when the capacitor is evacuated and tube 60 sealed since volume 64 is many times larger than the volume under diaphragm 16 alone. Thus, the affects of any leakage under the diaphragm are greatly attenuated.

Reexamining FIGS. 1-3 it should be obvious that as the pressure across diaphragm 16 varies the diameter of the portion of the diaphragm in contact with the dielectric will vary. In fact, in the pressure variable capacitor built the diameter varied approximately linearly with respect to pressure. Of course, the capacity varies linearly with the effective capacitor area, which in turn varies with the square of the aforementioned diameter. Thus, capacity will vary with the square of the pressure across the diaphragm. If it is desired to produce a pressure variable capacitor whose capacity varies linearly with pressure difference, the fixed electrode can be shaped so that its effective area varies linearly with diameter. If it is not desirable to shape the fixed electrode and linear variation of capacity with pressure is still required it is possible to use an electronic circuit such as that seen in FIG. 9 to obtain linearization. In that figure, a capacitor 68 of capacity C is charged by current I from a constant current source 66. The capacitor is discharged through resistor 64 of value R when an electronic switch, illustrated as switch 62, is closed. Switch 62 is closed during the output pulses of a rectangular wave generator 60 where the width of the output pulses is linearly related to capacity. The capacity for controlling wave generator 60 is, of course, obtained from a pressure variable capacitor. In this schematic, C is assumed to be large, considering IR and the switch 62 repetition frequency, so that voltage across capacitor 68 will come to an equilibrium value $e_c$. In analyzing the operation of the circuit of FIG. 9 consider that switch 62 is open for a period t and closed for a period $(T_o-t)$ where $T_o$ is the constant repetition period of wave generator 60. Then:

$$\Delta Q_1 = It$$

$$\Delta Q_2 = (I - \frac{e_c}{R})(T_o - t)$$

where
$\Delta Q_1$ = charges added to capacitor 68 during period t and
$\Delta Q_2$ = charges removed from capacitor 68 during period $(T_o\text{-}t)$.

At equilibrium:

$$It + (I - \frac{e_c}{R})(T_o - t) = 0.$$

Rearranging:

$$e_c = RI \frac{1}{1 - \frac{t}{T_o}}.$$

Since t is a pulse whose width is proportional to a capacity $C_1$ which varies with pressure, and if $T_o$ would be the width of this pulse if the value of capacity should become $C_o$, then:

$$e_c = RI \frac{1}{1 - \frac{C_1}{C_o}}.$$

Further, if $C_1$ is defined by the function:

$$C_1 = C_m \left(1 - \frac{K}{P_o + P}\right).$$

WHERE $C_m$, $P_o$ and $K$ are constants and $P$ is the pressure across the diaphragm $$\rho_c = RI \frac{1}{1 - \frac{C_m}{C_o}\left(1 - \frac{K}{P_o + P}\right)}.$$

If the repetition period $T_o$ is chosen so that
$C_o = C_m$ $$\rho_c = RI \left(\frac{P_o + P}{K}\right).$$

The above identity suggests that $e_c$ is a linear function of $P$.

Various embodiments of the invention having been shown, other alterations and modifications of the invention should now suggest themselves to one skilled in the art. Accordingly, the invention is to be limited only by the true spirit and scope of the appended claims.

The invention claimed is:

1. A fluid pressure variable capacitor comprising:
an electrically nonconductive substrate having a supporting surface;
an electrode comprising an electrically conductive film affixed to a portion of said supporting surface;
an electrically conductive diaphragm having a thin flexible active section which includes a central area; said active section being least stiff to forces perpendicular to said active section at said central area, said active section being increasingly stiffer as the distance along said diaphragm from said central area increases, said active section being relatively fixed at the outer extremity thereof with respect to forces perpendicular thereto, the periphery of said diaphragm being hermetically sealed to said supporting surface so that said active section overlies said electrode, said diaphragm and said electrode comprising the plates of said pressure variable capacitor; and,
a dielectric film disposed between said diaphragm and said electrode;
said capacitor being useful for producing a capacity related to difference of pressure across said diaphragm at least in a predetermined pressure difference range, said active section being in contact with said electrode through said dielectric film at said central area at the low end of said range and rolling into increasingly greater area of contact with said electrode through said dielectric film as the pressure difference across said diaphragm increases, the area of contact of said diaphragm with said electrode through said dielectric film at the high end of said range being at least several magnitudes greater than said central area and wherein said diaphragm, when flat, is relatively close to said electrode.

2. The fluid pressure variable capacitor of claim 1 with a cupshaped rigid structure hermetically sealed to the surface of said substrate opposite said diaphragm to form a closed space between the opposite surface of said substrate and said structure and with a passage through said substrate to permit equilization of pressure on both sides of said substrate.

3. The fluid pressure responsive capacitor of claim 1 wherein said dielectric film is affixed to and over said electrode.

4. The fluid pressure variable capacitor of claim 1 wherein the space enclosed by said diaphragm is at least partially evacuated and sealed.

5. The fluid pressure variable capacitor of claim 4 wherein said diaphragm is normally flat and secured at the periphery thereof.

6. The fluid pressure responsive capacitor of claim 4 wherein said diaphragm is relatively free to change size radially in response to temperature changes.

7. A fluid pressure variable capacitor comprising:
a first electrode;
a support member having an electrically nonconductive gas impervious surface upon which said first electrode is supported;
a gas impervious diaphragm means comprising a second electrode and having a flexible active section which includes a central area and including means supporting said active section to be relatively immovable at the outer extremity thereof in a direction perpendicular to the plane of said active section, said active section being increasingly less stiff as the distance from said outer extremity toward said central area increases, said diaphragm means being in hermetically sealed relationship with said gas impervious surface, said first and second electrodes forming plates of said pressure variable capacitor; and,
a dielectric film interposed between said first and second electrodes, said second electrode being disposed at a relatively close distance to said first electrode so that at least a portion of said first and second electrodes are in increasingly greater area of contact with one another through said dielectric film from a relatively small area of contact to an area of contact several magnitudes greater as the pressure difference across said diaphragm means increases.

8. The fluid pressure variable capacitor of claim 7 wherein the area of contact of said first and second electrodes through said dielectric film is approximately circular.

9. The fluid pressure variable capacitor of claim 7 wherein the space between said diaphragm and said surface is evacuated.

10. The fluid pressure variable capacitor of claim 7 wherein said diaphragm includes an elastomer means for supporting said second electrode in said hermetically sealed relationship with said gas impervious surface.

* * * * *